(12) United States Patent
Katyal et al.

(10) Patent No.: US 8,245,920 B1
(45) Date of Patent: Aug. 21, 2012

(54) SYSTEM AND METHOD FOR RECONCILING CREDIT CARD PAYMENTS WITH CORRESPONDING TRANSACTIONS

(75) Inventors: Dinesh Kumar Katyal, Fremont, CA (US); James Alan Schneider, San Jose, CA (US); David C. Lo, Bedford, MA (US); John Hodgkinson, Arlington, MA (US)

(73) Assignee: Intuit Inc., Mountain View, CA (US)

( * ) Notice: Subject to any disclaimer, the term of this patent is extended or adjusted under 35 U.S.C. 154(b) by 505 days.

(21) Appl. No.: 12/353,007

(22) Filed: Jan. 13, 2009

Related U.S. Application Data

(63) Continuation of application No. 11/490,682, filed on Jul. 21, 2006, now Pat. No. 7,726,561.

(51) Int. Cl.
*G06K 5/00* (2006.01)
(52) U.S. Cl. .............................. 235/380; 235/379
(58) Field of Classification Search ............ 235/379, 235/380; 705/39, 40
See application file for complete search history.

(56) References Cited

U.S. PATENT DOCUMENTS

| | | | | |
|---|---|---|---|---|
| 5,991,750 A * | 11/1999 | Watson | | 705/44 |
| 6,006,204 A * | 12/1999 | Malcolm | | 705/30 |
| 6,324,525 B1 * | 11/2001 | Kramer et al. | | 705/40 |
| 7,302,408 B2 * | 11/2007 | Engdahl et al. | | 705/30 |
| 2003/0110136 A1 * | 6/2003 | Wells et al. | | 705/64 |
| 2006/0116954 A1 * | 6/2006 | Strayer et al. | | 705/39 |
| 2007/0130028 A1 * | 6/2007 | Provinse | | 705/27 |

* cited by examiner

*Primary Examiner* — Ahshik Kim
(74) *Attorney, Agent, or Firm* — Park, Vaughan, Fleming & Dowler LLP

(57) ABSTRACT

One embodiment of the present invention provides a system for facilitating a financial transaction. During operation, the system receives a request for a financial transaction from a merchant, wherein the financial transaction involves a payment to the merchant. Next, the system obtains a unique transaction identifier for the financial transaction. The system then associates the unique transaction identifier with the request to facilitate reconciliation of the financial transaction. Finally, the system forwards the request along with the unique transaction identifier to one or more financial institutions for subsequent processing of the financial transaction, which can involve reconciliation and/or settlement of the financial transaction.

16 Claims, 2 Drawing Sheets

SYSTEM AND METHOD FOR RECONCILING CREDIT CARD PAYMENTS WITH CORRESPONDING TRANSACTIONS

RELATED APPLICATION

The present patent is a continuation of, and hereby claims priority under 35 U.S.C §120 to, pending U.S. patent application Ser. No. 11/490,682, entitled "System and Method for Reconciling Credit Card Payments with Corresponding Transactions," by inventors Dinesh Kumar Katyal, James Alan Schneider, David C. Lo and John Hodgkinson, filed on 21 Jul. 2006.

BACKGROUND

Merchants that accept credit cards from customers for sales transactions receive little assistance in matching payments from their credit card service provider with the corresponding sales transactions. This has been an unavoidable consequence of the way credit card transactions are processed.

In particular, when a merchant accepts a credit card as the means of payment for a good or service, the card is first authorized (e.g., by the credit card's issuer). The sales transaction proceeds if the authorization is successful. At some later time, a settlement request is forwarded to the issuer (or a credit card processor) to recoup payment for the transaction. Upon settlement, funds are generally transferred to the merchant (e.g., to the merchant's bank) as a lump sum corresponding to any number of sales transactions; there is no indication of which transaction or transactions the funds are for.

Traditionally, if a merchant wished to reconcile a settlement payment with corresponding sales transactions, the merchant had to manually identify a set of transactions having an aggregate amount that matches the amount of the payment. This is very imprecise, especially for merchants that handle a large number of credit card transactions, as many permutations of transaction amounts could be represented by a single payment. For example, a payment of $100 could be for a single $100 transaction, two $50 transactions, a $50 transaction and two $25 transactions, etc.

In addition, because the settlement of a specific transaction is rarely specifically reported to a merchant, the merchant cannot quickly and easily identify transactions that failed (e.g., stolen card, possible fraud) or that were reversed (e.g., via chargeback).

SUMMARY

In one embodiment of the invention, a system and methods are provided for reconciling a deposit to a merchant account (e.g., from a merchant acquirer) with a set of credit card transactions corresponding to the payment.

In this embodiment, a reconciliation facilitator assigns unique transaction IDs to credit card transactions submitted by the merchant. The reconciliation facilitator issues authorization requests for some or all of the transactions, and also submits a settlement request for authorized transactions, wherein one or both types of requests include the unique transaction IDs of the associated transactions.

When a set of transactions is settled, the unique IDs of the transactions are received as part of the settlement data, and the reconciliation facilitator can identify the settled transactions to the merchant (e.g., through his accounting software, point-of-sale software or other application).

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In one embodiment of the invention, a system and method are provided for reconciling a payment to a merchant for a set of credit card transactions (or transactions involving a debit card or other similar instrument) with the actual transactions the payments correspond to, or facilitating such reconciliation. The payment to the merchant may be received directly by the merchant or may be deposited in a bank account or other account of the merchant. The payment may be received directly from a card issuer, or may be received via a credit/debit card processor, merchant account processor or other entity.

Embodiments of the invention described herein are well suited for implementation with (or within) an accounting program, financial management software, a point-of-sale program or other application software operated by a merchant that may or may not be financial in nature (e.g., a web application). For example, an accounting or financial services program such as QuickBooks (available from Intuit, Inc.) may be operated by a merchant to initiate or facilitate credit card transactions, and may communicate with other software operated by a reconciliation facilitator to submit credit card authorization requests, initiate settlement requests for authorized credit card transactions, receive details of approved settlement requests, reconcile details of an approved settlement request with the corresponding credit card transactions, etc.

Although embodiments of the invention are described below as they may be implemented for facilitating reconciliation of credit card transactions, such embodiments may be readily modified to also (or instead) facilitate reconciliation of transactions involving debit cards, charge cards and/or other comparable instruments, ACH (Automated Clearinghouse) transactions, PayPal transfers and so on.

Figure 1:
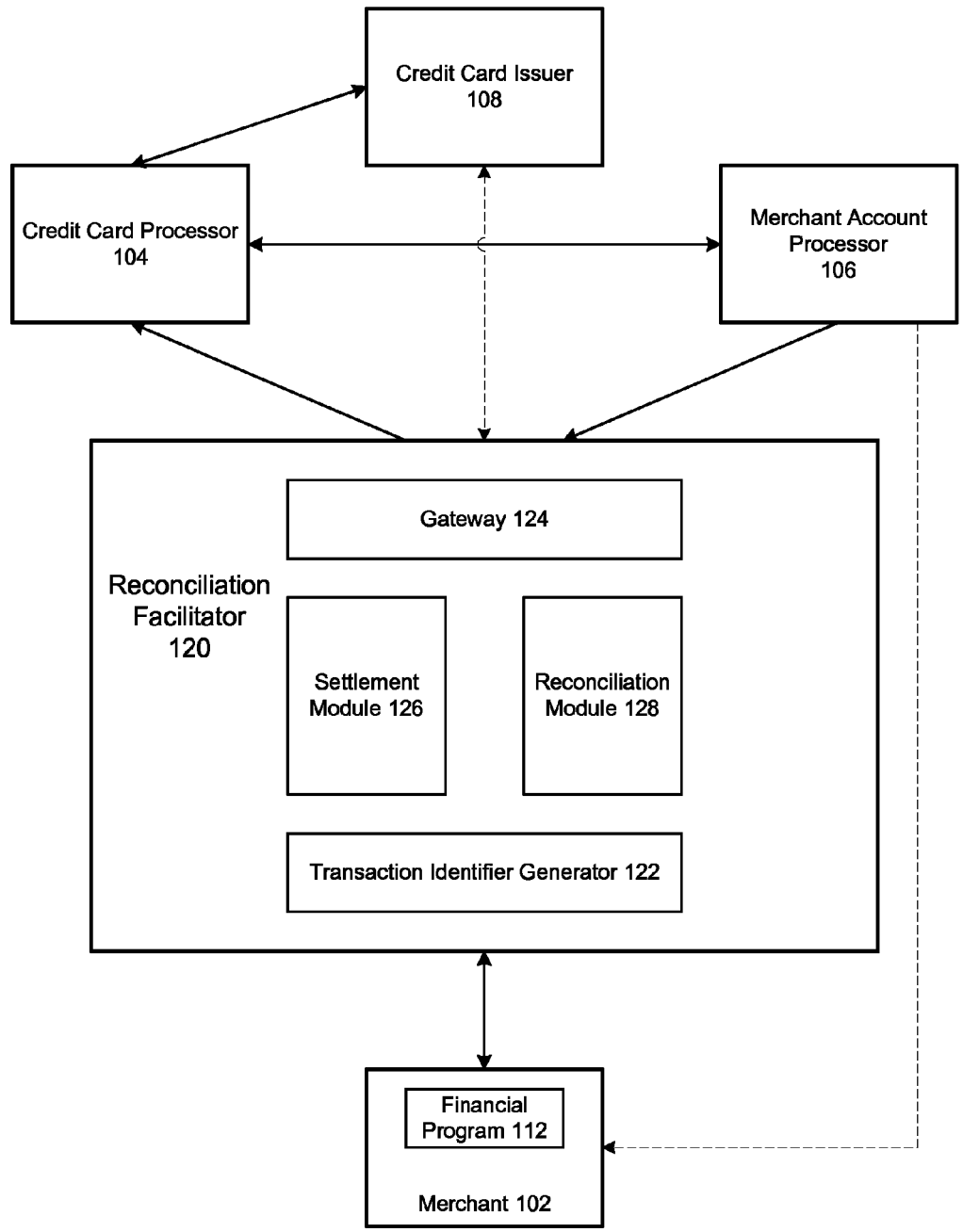
FIG. 1 is a block diagram depicting a reconciliation facilitator for facilitating reconciliation of a settlement payment with corresponding credit card transactions, in accordance with an embodiment of the present invention.

FIG. 1 depicts a reconciliation facilitator configured to facilitate reconciliation of credit card transactions with payments to a merchant for those transactions, according to one embodiment of the invention.

In the illustrated embodiment of the invention, merchant 102 may be an online or "brick and mortar" merchant that accepts credit cards as a means of payment for a good or service. The merchant operates software (on a computer or sales terminal) configured to accept credit card data (e.g., credit card number, name, security code), which may be read directly from the card (e.g., when it is "swiped" across a credit card reader) or may be entered by the merchant or customer via keyboard, keypad or other means. Thus, the merchant may or may not have physical access to a customer's credit card, depending on whether the customer is conducting the transaction in person or online.

The merchant software need not store or retain sensitive credit card data for a long period of time, thereby alleviating security and/or privacy concerns of customers and/or other parties. Data for a particular transaction may only need to be retained until a unique transaction identifier has been assigned to the transaction (e.g., by reconciliation facilitator 120), as described below.

Credit card issuer 108 is an issuer of credit cards, debit cards and/or other charge cards or similar instruments, such as VISA, MasterCard, American Express, Discover or other entity that issues credit cards, debit cards and/or other charge cards or similar instruments.

Credit card processor 104 is an entity or organization that may interact with issuers of one or more types of credit cards (and/or debit cards, charge cards, etc.) on behalf of reconciliation facilitator 120 and/or other entities. For example, credit card processor 104 may be FDR (First Data Resources) or First Data Corporation, and other processors are also known to one of ordinary skill in the art.

Credit card processor 104 can accept authorization requests, settlement requests and/or other communications from reconciliation facilitator 120 for multiple credit card issuers, and interact with those issuers on behalf of the reconciliation facilitator. This alleviates the reconciliation facilitator from having to interact with multiple different credit card issuers. However, in an alternative embodiment of the invention, reconciliation facilitator 120 may interface directly with a credit card issuer, in addition to or instead of interacting with credit card processor 104.

Merchant account processor 106 is an entity or organization that receives funds for settled credit card transactions on behalf of merchants such as merchant 102. In one embodiment, merchant account processor 106 is IMS (Innovative Merchant Solutions), an Intuit company; other merchant account processors are also known in the art. The merchant account processor may forward funds directly to a merchant or to a merchant's bank account or other destination.

Reconciliation facilitator 120 comprises transaction identifier generator 122, gateway 124, settlement module 126 and reconciliation module 128, and is configured to perform various services on behalf of merchants such as merchant 102. For example, the reconciliation facilitator may submit credit card authorization requests (to ensure a credit card is valid), submit settlement requests for authorized credit card transactions, receive data relating to approved settlements, help identify which credit card transactions have been settled, etc.

As described below, transaction identifier generator 122 is configured to generate unique transaction identifiers (or IDs) for credit card transactions initiated by merchant 102. A particular identifier may be unique among all merchants served by the reconciliation facilitator or may just be unique to the individual merchant.

Settlement module 126 assembles and submits settlement requests (e.g., to credit card processor 104), while reconciliation module 128 receives settlement data regarding adjudicated settlement requests and initiates reconciliation of a settlement payment with the individual transactions submitted by merchant 102 to which the payment corresponds. Gateway 124 may be a gateway accounting server or other entity configured to forward authorization requests, settlement requests and/or other communications to credit card processor 104, credit card issuer 108 and/or other entities.

Reconciliation facilitator 120 may be coupled to merchant 102, credit card processor 104, merchant account processor 106 and/or other entities via a network such as the Internet, other shared communication links (e.g., an intranet or wide area network) and/or dedicated connections. Such communication links may include wired and/or wireless links. In one embodiment, reconciliation facilitator 120 may coexist or cooperate closely with merchant account processor 106.

Further, the reconciliation facilitator may comprise a single computer or multiple computers closely or loosely coupled, with functions of the various components of the facilitator being load-balanced between different computers or centralized on one or a number of computers. In other embodiments of the invention, reconciliation facilitator 120 may include various other components omitted in FIG. 1 for the sake of clarity (e.g., a database, a database server, a security module for securing communications and transactions), or may comprise additional or fewer components than are depicted in FIG. 1; yet further, functions of the components of a reconciliation facilitator may be merged or further divided.

Figure 2:
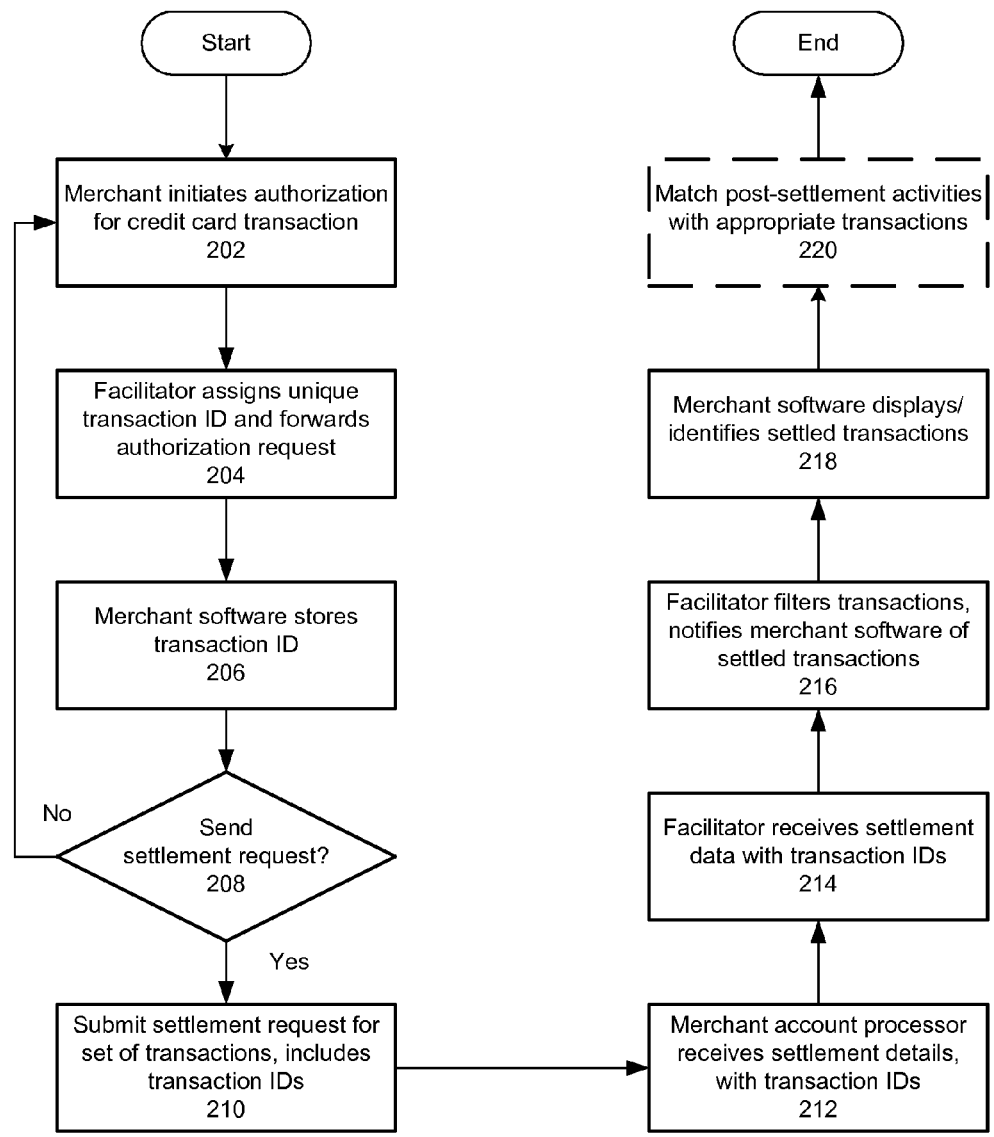
FIG. 2 is a flowchart illustrating one method of facilitating reconciliation of a settlement payment with corresponding credit card transactions, in accordance with an embodiment of the invention.

A method of facilitating reconciliation of credit card transactions with payments for settled transactions is now described with reference to FIG. 2.

In operation 202, a customer presents to a merchant a credit card (e.g., in person) or offers data from his or her credit card (e.g., online) for a purchase, and the merchant initiates an authorization request to determine whether to accept the credit card as means of payment for the purchase.

In this embodiment of the invention, the merchant operates or cooperates with some type of financial software (e.g., accounting or point-of-sale processing client software) for configuring and tracking sales transactions. For example, software such as financial program 112 (in FIG. 1) may operate on a server, a workstation or other type of computer, and accept the customer's order and credit card data. The software then communicates appropriate credit card data (e.g., number, name, expiration date, security code) to a reconciliation facilitator so that the facilitator can submit the authorization request to a credit card processor or issuer.

The reconciliation facilitator operates software (e.g., server software corresponding to the merchant's client software) that accepts credit card data from the merchant and formats and submits an authorization request to the appropriate credit card processor or issuer (e.g., via gateway 124 in FIG. 1). In one implementation, the merchant operates a client version of QuickBooks software or other financial management software, while the reconciliation facilitator operates a central or server version of compatible software configured to interact with multiple merchants' software.

In operation 204, the facilitator assigns a unique transaction ID to the merchant's authorization or payment request, reports that ID to the merchant and includes it or associates it with the authorization request sent to the credit card processor or issuer. Illustratively, the facilitator generates a unique ID for every credit card authorization request received from the merchant, as well as any transaction that can proceed without authorization (e.g., capture of a previously authorized transaction).

Alternatively, a unique identifier may be assigned by the credit card processor or issuer and provided to the reconciliation facilitator, in addition to or instead of the facilitator's unique ID. Regardless of which entity generates the unique ID (e.g., reconciliation facilitator, credit card processor), as described below, that ID will be returned to the facilitator with settlement data for payments to the merchant, thereby allowing the facilitator to match payments with specific credit card transactions.

Also in operation 204, the reconciliation facilitator submits the authorization request to the credit card processor or issuer.

In operation 206, the merchant software stores the unique transaction ID and associates it with the sales receipt, payment against an invoice or other transaction for which it is being used.

If the authorization request is approved, the facilitator receives the authorization response from the credit card processor or issuer and notifies the merchant. The merchant can then proceed with the transaction.

Generation and assignment of the unique transaction ID, and its storage by the merchant software (and reconciliation facilitator), occurs in real-time or near real-time, along with creation and submission of the authorization request.

In operation 208, additional transactions may be authorized and performed by repeating operations 202 though 206. As specified above, each transaction may involve a separate authorization request and response, and each transaction (or at least each authorized transaction) is assigned a separate unique transaction ID that is stored by the merchant software and the reconciliation facilitator.

In operation 210, a settlement request is generated and submitted to the credit card processor or issuer some time after the merchant's transaction(s). For example, a settlement request may be issued automatically every day (or every business day) for the purpose of settling that day's credit card transactions and requesting payment for the transaction(s) from the credit card issuer (or the issuer's bank or other financial institution) for the merchant.

In the illustrated embodiment of the invention, the settlement request is generated and submitted by the reconciliation facilitator on behalf of the merchant, either automatically or in response to a request from the merchant. The settlement request may pertain to any number of credit card transactions that have not yet settled—transactions for just this merchant or for any number of merchants. The settlement request may be initiated by the reconciliation facilitator, or the merchant (e.g., the merchant's software) may spur the reconciliation software to submit the request.

The settlement request, like the authorization requests, may include virtually any information (e.g., credit card number, date/time of transaction, merchant identity, amount), but will also include the unique transaction ID of each transaction covered by the settlement request. A settlement request may also include the corresponding transactions.

A settlement request, authorization request and/or other communication may be characterized as being issued by the reconciliation facilitator "toward" a credit card issuer, in that they are directed to the issuer or an entity that interacts with the issuer on behalf of the facilitator (e.g., credit card processor 104 of FIG. 1).

Reconciliation facilitator 120 (e.g., gateway 124) may automatically initiate credit card transactions or settlement requests on a regular basis, in addition to initiating such actions upon demand by a merchant. For example, periodic (e.g., monthly) charges may be made to a credit card for a subscription service, settlement requests may be configured and submitted after every working day (or at some particular time every day), etc.

In operation 212 a merchant account processor, which may operate with or be allied with the reconciliation facilitator, receives settlement data for some or all of the merchant's transactions included in the settlement request. The settlement data may include any information (e.g., credit card number, date, time, merchant identifier), but in particular includes the unique transaction ID for each settled transaction.

In operation 214, the merchant account processor forwards some or all settlement data to the reconciliation facilitator, including the transaction ID for each settled transaction.

In operation 216, the reconciliation facilitator filters the settled transaction as necessary to identify those that belong to the merchant. The filtering may be performed based on entire unique transaction IDs or just a portion of the IDs (e.g., a portion that identifies a particular merchant).

The reconciliation facilitator also notifies the merchant (e.g., the merchant's software client) of the settled transactions. The facilitator may simply identify the transactions that settled (e.g., by their unique transaction IDs), or may include additional data (e.g., amount, date of transaction, date of settlement/payment), as desired.

In operation 218, the merchant software displays the status of the settled transactions as desired by the merchant. Thus, a report may be printed showing their settled status, the transactions may be marked as settled in an on-screen display, etc.

In optional operation 220, one or more non-settlement actions pertaining to the merchant's transactions may be reconciled with the corresponding transaction(s). Such actions may include a rejection of a transaction, a chargeback, a hold, etc. Notifications of these types of actions are generally received separate from settlements.

In the illustrated embodiment of the invention, in optional operation 220 the merchant account processor (and/or the reconciliation facilitator) receives a report of such an action from the credit card processor or issuer, but the report may omit the unique transaction ID of the offending transaction (s). Therefore, the merchant account processor (or reconciliation facilitator) may correlate an offending transaction with the appropriate transaction ID by cross-referencing other information.

Illustratively, the credit card processor or issuer periodically sends a transaction log summarizing or itemizing transactions occurring during a period. Then, some other identifier of the offending transaction that is included in the report (e.g., an identifier assigned by the issuer of the report) may be correlated with a transaction log or previous report that includes the other identifier as well as the unique transaction ID. In some circumstances, even settlement data passed to a reconciliation facilitator or merchant account processor may lack a transaction ID, therefore requiring correlation with a transaction log or previous report to determine the ID.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof.

In particular, methods described herein may be implemented using data structures and program code residing on a suitable computer-readable medium, which may be any device or medium that can store data and/or code for use by a computer system. This includes, but is not limited to, volatile memory, non-volatile memory, magnetic and optical storage devices such as disk drives, magnetic tapes, CDs (compact discs), DVDs (digital versatile discs or digital video discs), or other media capable of storing computer-readable media now known or later developed.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A method of reconciling a payment to a merchant for a set of credit card transactions, the method comprising:
    accepting from a merchant payment requests for multiple credit card transactions;
    for each transaction:
        submitting an authorization request for the transaction toward a credit card issuer;
        receiving a unique transaction identifier from the credit card issuer; and
        transmitting the transaction identifier to the merchant; and
    forwarding a settlement request toward the credit card issuer, wherein the settlement request comprises the transaction identifiers of each transaction in the multiple transactions that was authorized;
    receiving settlement of the settlement request, wherein the settlement comprises data that includes the transaction identifiers of one or more transactions in the multiple transactions; and
    automatically matching transaction identifiers of transactions that settled with transaction identifiers of the multiple transactions.

2. The method of claim 1, wherein subsequent processing of a financial transaction involves debiting an account associated with a customer and making a corresponding payment to the merchant.

3. The method of claim 1, wherein the unique transaction identifier is unique across a set of merchants, or is unique for an individual merchant.

4. The method of claim 1, wherein the subsequent processing of a financial transaction involves returning settlement information for the financial transaction to the merchant, wherein the settlement information includes the unique transaction identifier.

5. The method of claim 1, further comprising receiving notification of non-settlement of a transaction, wherein the notification omits the unique transaction identifier of the transaction.

6. The method of claim 5, wherein the transaction is correlated with the unique transaction identifier by cross-referencing other information.

7. A non-transitory computer-readable storage medium storing instructions that, when executed by a computer, cause the computer to perform a method of facilitating a financial transaction, the method comprising:
    accepting from a merchant payment requests for multiple credit card transactions;
    for each transaction:
        submitting an authorization request for the transaction toward a credit card issuer;
        receiving a unique transaction identifier from the credit card issuer; and
        transmitting the transaction identifier to the merchant; and
    forwarding a settlement request toward the credit card issuer, wherein the settlement request comprises the transaction identifiers of each transaction in the multiple transactions that was authorized;
    receiving settlement of the settlement request, wherein the settlement comprises data that includes the transaction identifiers of one or more transactions in the multiple transactions; and
    automatically matching transaction identifiers of transactions that settled with transaction identifiers of the multiple transactions.

8. The computer-readable storage medium of claim 7, wherein subsequent processing of a financial transaction involves debiting an account associated with a customer and making a corresponding payment to the merchant.

9. The computer-readable storage medium of claim 7, wherein the unique transaction identifier is unique across a set of merchants, or is unique for an individual merchant.

10. The computer-readable storage medium of claim 7, wherein the subsequent processing of a financial transaction involves returning settlement information for the financial transaction to the merchant, wherein the settlement information includes the unique transaction identifier.

11. The computer-readable storage medium of claim 7, further comprising receiving notification of non-settlement of a transaction, wherein the notification omits the unique transaction identifier of the transaction.

12. The computer-readable storage medium of claim 11, wherein the transaction is correlated with the unique transaction identifier by cross-referencing other information.

13. An apparatus for reconciling a payment to a merchant for a set of credit card transactions, comprising:
    a processor;
    a memory;
    an acceptance mechanism configured to accept from a merchant payment requests for multiple credit card transactions;
    a submission mechanism configured to submit an authorization request for each transaction toward a credit card issuer;
    a receiving mechanism configured to receive a unique transaction identifier from the credit card issuer for each transaction;
    a transmission mechanism configured to transmit the transaction identifier for each transaction to the merchant;
    a forwarding mechanism configured to forward a settlement request toward the credit card issuer, wherein the settlement request comprises the transaction identifiers of each transaction in the multiple transactions that were authorized;
    the receiving mechanism further configured to receive settlement of the settlement request, wherein the settlement comprises data that includes the transaction identifiers of one or more transactions in the multiple transactions; and
    a matching mechanism configured to automatically match transaction identifiers of transactions that settled with transaction identifiers of the multiple transactions.

14. The apparatus of claim 13, wherein subsequent processing of a financial transaction involves debiting an account associated with a customer and making a corresponding payment to the merchant.

15. The apparatus of claim 13, wherein the unique transaction identifier is unique across a set of merchants, or is unique for an individual merchant.

16. The apparatus of claim 13, wherein the subsequent processing of a financial transaction involves returning settlement information for the financial transaction to the merchant, wherein the settlement information includes the unique transaction identifier.

* * * * *